April 1, 1941.  S. J. STRID  2,236,654
BRAKE STEP FOR RAILWAY CARS
Filed July 31, 1940
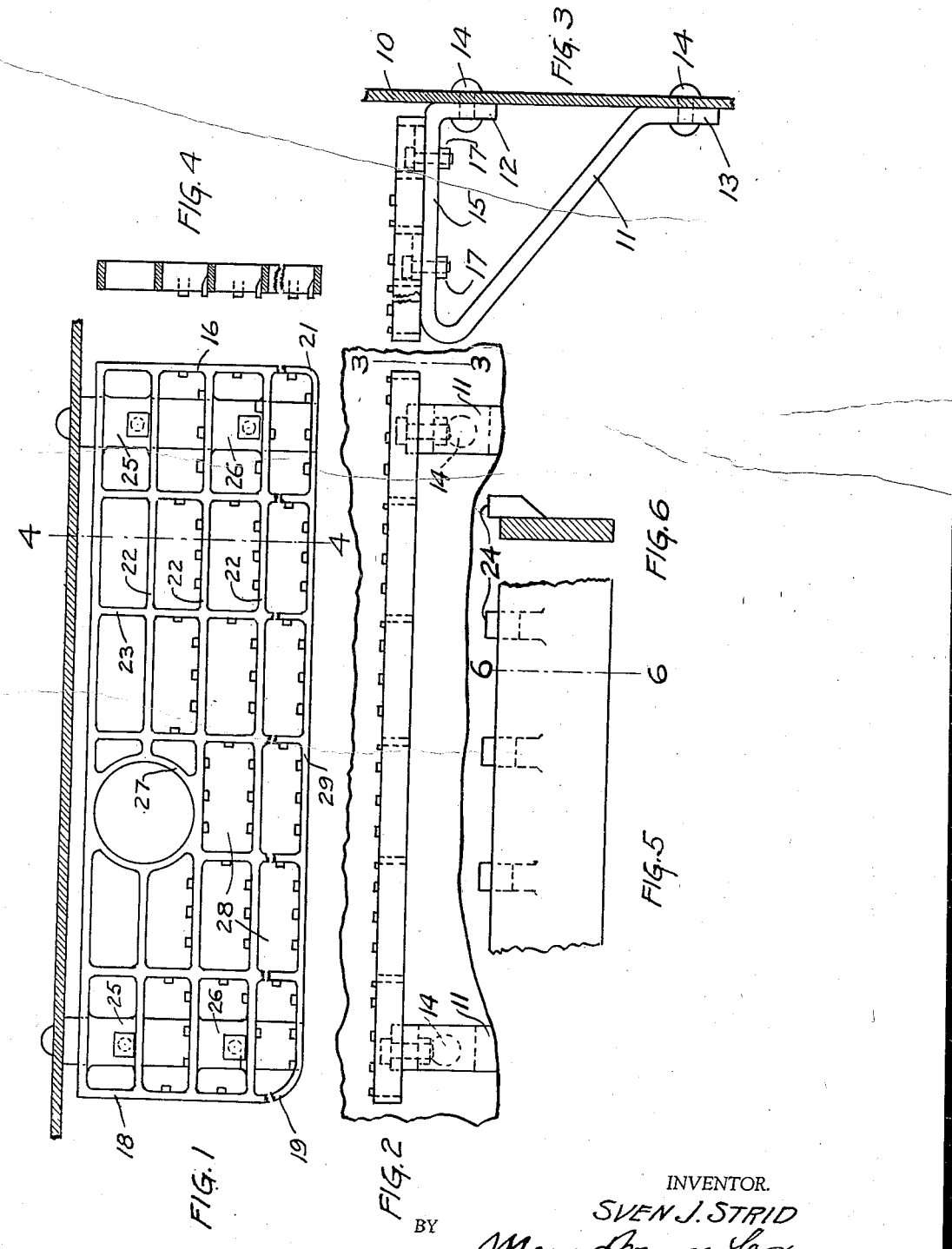
INVENTOR.
SVEN J. STRID
BY Mann Brown & Cox
ATTORNEYS.

/ Patented Apr. 1, 1941

2,236,654

UNITED STATES PATENT OFFICE 2,236,654

BRAKE STEP FOR RAILWAY CARS

Sven J. Strid, Chicago, Ill.

Application July 31, 1940, Serial No. 348,707

6 Claims. (Cl. 105—443)

This invention relates to railway car equipment and more particularly to brake steps, running boards, or other tread members for railway cars and the like.

One of the objects of the invention is the provision of a new and improved brake step or running board for railway cars having a novel tread for preventing the brakeman slipping on the step while applying the brake during the operation of the car.

A further object of the invention is the provision of new and improved anti-slipping elements incorporated in brake steps or brake platforms and of such construction that mud, dirt, snow or the like cannot collect on said elements on the step or associated parts thereof.

A further object of the invention is the provision of a new and improved brake step that is simple in design, efficient in operation, rugged in construction, and one that may be manufactured at a low cost and installed with a minimum of time and labor.

Other and further objects and advantages of the invention will appear from the following description taken in connection with the accompanying drawing in which:

Fig. 1 is a plane view of the brake step showing the same in position on the end of a car, with parts in sections and parts broken away;

Fig. 2 is an end elevation of the car showing the invention in position thereon, with parts broken away;

Fig. 3 is a vertical section on the line 3—3 of Fig. 2;

Fig. 4 is a section on the line 4—4 of Fig. 1;

Fig. 5 is a side elevation of the brake step, with parts broken away, and on an enlarged scale; and Fig. 6 is a section on the line 6—6 of Fig. 5.

In movement of freight cars in switch yards and under various other conditions, it is necessary to operate the brakes on the car by manually operated means. It is common practice to mount the brake operating wheel on the end wall of the car to rotate about a vertical axis. Such an arrangement necessitates a brake step or platform below the wheel on which the brake operator or brakeman may stand while turning the wheel for applying the brakes. This brake step is necessarily on the exterior of the car and consequently is subjected to all year weather conditions. Being on the outside of the car, serious accidents may and do occur because of insecure footing for the brakeman on the brake step or platform due to mud, snow or ice accumulating on the upper surface of the step and forming a slippery surface. The same type of tread is useful on cat walks, running boards, and the like and such use is contemplated. For the sake of simplicity of description and illustration, the invention is shown as being embodied in a brake step only.

The present invention seeks to provide a step that has anti-slipping means on the surface of the step so constructed that said means will not become ineffective by the accumulation of mud, dirt, and snow or the like. In applicant's construction, the step is reticulated or of grid formation so that mud, dirt, snow and ice may fall through the grids. Anti-slipping devices in the form of upstanding studs or projections extending slightly above the plane of the upper surface of the grids are provided. These studs or projections are secured to and integral with the sides of the grids, that is they are offset from the grids or bars consisting of the step so that dirt, mud, snow or the like can not build up from the grid on but one side of the projection, at most. When the projections rise vertically from the top surface of the step, mud, dirt and snow may collect all around the base of the projections and further accumulation of such material will render these anti-slipping devices practically useless. But where the projections are offset or are attached at one side only of the grid or bar only that one side can collect any snow, mud, or dirt because of the vertical walls on the sides not being attached. Preferably the brake step is cast and the anti-slipping studs are angular in cross-section so as to present sharp cutting edges at the corners and top edges of the stud that are calculated to bite into the soles of the brakeman's shoe for preventing slipping on the step. While in the preferred construction the step is cast, it is understood that the step and anti-slipping studs may be a built-up structure with the parts welded together instead of cast integral. But for convenience in description and simplicity of illustration, the disclosure will be of the type in which all parts of the step per se are cast integral.

Referring now to the drawing, the reference character 10 designates the end wall of the railway car on which is secured a plurality of brackets 11 which may be of the usual or any well-known structure. Any suitable type of bracket may be employed, that shown on the drawing being made from a single length of metal bent to the form of a right angle triangle and having its ends 12 and 13 bent in the same plane to form feet which are adapted to be secured to the end wall 10 as by means of rivets 14 or the like. The brackets 11 have their upper portion 15 extending in a horizontal plane on which rests the brake step 16. The brake step 16 is adapted to be rigidly connected to the brackets 15 as by means of bolts 17 or other fastening means, as will presently appear.

The step 16 may be made in any suitable manner but is preferably cast and comprises a substantially rectangular frame 18, the outer corners 19 and 21 of which may be rounded if desired. The step is in the form of a lattice, that is, the step is reticulated, having ribs, bars or grids extending at right angles to each other from side to side and from end to end of the frame. Cast integral with the frame 18 are a plurality of longitudinally extending bars or ribs 22 and a plurality of transversely extending bars or webs 23. The longitudinal bars 22 and the transverse webs or bars 23 are cast integral with the frame and with one another and are in the same plane as the frame.

Cast integral with or rigidly attached to these two sets of bars are a plurality of anti-slipping studs or projections 24 which are offset from the bars and extend upwardly a short distance above the plane of the same, as shown more clearly in Figs. 5 and 6 of the drawing. These projections 24 may be of any suitable cross section but, as shown, they are rectangular and have sharp corners. These projections are on both the longitudinal and transverse bars and are so arranged and of such a distance apart that the heel of the brakeman's shoe can not pass down between or among them at any point on the tread of the step. Cast integral with the end portions of the step are inner and outer attaching webs 25 and 26, respectively. These webs do not extend the full height of the step and are provided with openings through which the attaching bolts 17 are adapted to extend for connecting the step to the brackets 15, as pointed out above. The tops of the webs 26 are of such distance from the plane of the upper surface of the step that the heads of the bolts 17 will not project above the upper surface of the step.

Within the frame but adjacent to one side of the step is an annular member 27 through which the chain or staff operating the brake is adapted to extend. This annular member is integral with the adjacent frame, webs and bars and may be located at any desired position along the inner side edge of the plate as occasion may require. The inner side of the frame and one or more of the longitudinal bars 22 adjacent to the inner side edge of the step need not be provided with anti-slip projections 24 for the reason that they are too close to the car end to be of any service.

The length and width of the brake step or footboard is that conventionally employed on freight cars but may be of any suitable dimensions. The dimensions of the longitudinal and transverse bars and their distances apart and number and dimensions of the anti-slipping studs may be varied within great limits but preferably they should be such as to give a firm footing for the shoes of the brakeman using the step. The following dimensions give satisfactory results and are given by way of example only. The frame is 9½" x 29" over all dimensions. There are five longitudinal bars, three only being shown and five transverse bars each trapezoidal in cross-section, the upper horizontal dimension of these bars and the frame bars being $\frac{7}{16}$" and the lower $\frac{7}{32}$" with a vertical dimension of 1" These bars form rectangular openings 28 arranged in rows longitudinally and transversely of the step. These openings are long and narrow.

At the point where the annular member 27 appears, these openings are necessarily non-rectangular. The outer longitudinal frame member 29 is provided with six sets of three anti-slipping studs, a set for each opening along which the frame member extends.

Each longitudinal bar is likewise provided with a similar member except at points where they are attached to the brackets. The transverse bars 23 each have only 5 studs thereon, one for each of the first five rows of openings, there being none for the sixth or inner row because of its non-accessibility to use as pointed out alone.

Each anti-slipping stud or projector is preferably though not necessarily cast integral with the step. Each is shown as being rectangular in cross-section, the dimensions being $\frac{3}{16}$" x ¼' at its upper end and extends above the upper surface of the step approximately ⅛". These studs are of such distances apart and so arranged as to prevent the heels of a brakeman's shoe from passing down among them. In other words, a safety tread surface is provided that will not accumulate dirt, mud, snow and the like so far as to become more or less dangerous in use.

While the dimensions given give satisfactory results, it is understood that these dimensions may be varied without departing from the spirit of the invention. For instance, the anti-slipping studs may be circular or any other suitable form in cross-section, it being only necessary that they be offset from their supporting bars and be sufficiently close together to form a practical tread. By providing these studs on the side faces of the supporting bars, mud, dirt, snow and the like cannot collect at their bases on but the one point where they are connected to their supports and hence the step is self-cleaning under operating conditions. This is considered an important feature of the invention because when mud, dirt, snow and the like can accumulate all around the base of the anti-slipping elements, it is only a short time until the anti-slipping projections are either covered up or are covered to such an extent as to become of little or no use as anti-slipping devices on the step. It is also understood that the invention is capable of various uses other than those enumerated where an anti-slipping surface is necessary or desirable whether it be exposed or unexposed to the weather.

It is thought from the foregoing, taken in connection with the accompanying drawing, that the construction and operation of my device will be apparent to those skilled in the art and that changes in size, shape, proportion and details of construction may be made without departing from the spirit and scope of the appended claims.

I claim as my invention:

1. A brake step comprising a cast metal plate having one set of bars extending longitudinally of the plate in spaced relation and another set of bars extending transversely of the plate in spaced relation to one another and cast integral with the first named bars, said bars forming openings smaller in dimensions than the heel of a brakeman's shoe, and angular projections integral with said bars and extending a short distance above the plane of said bars and laterally thereof, for constituting anti-slipping devices.

2. A brake step cast in the form of a reticulated plate having a substantially rectangular frame provided with a set of integral bars extending longitudinally of the frame and a set of integral bars extending transversely to said frame and forming with said first named bar and said frame rectangular openings of less width than the smallest dimension of the heel of a brakeman's shoe, each of said bars being provided with upstanding, anti-slipping studs spaced apart and surrounding each of said openings except those along the inner side of said step, the upper portions of said studs being in planes laterally of the bars to which they are attached, respectively.

3. A brake step for railway cars comprising a reticulated member having bars extending in different directions to form a tread surface, and upstanding studs attached to the side faces of said bars and extending slightly above the plane of said bars to form a tread surface.

4. A tread member having a lattice-like construction having openings therethrough, the marginal walls of said openings having upstanding projections secured to the lateral surfaces of said walls and so arranged that the heel of a conventional man's shoe cannot pass downward among said projections.

5. A tread member comprising a reticulated plate comprising narrow bars crossing one another at angles and forming small openings, upstanding studs carried by said bars the upper ends of the studs on each bar being in planes parallel with the bar to which they are attached and extending slightly above the upper surfaces of the bars, said studs being spaced apart such distance that the heel of a man's shoe will be prevented from passing downward among the studs.

6. A tread member for vehicles and the like, comprising a plurality of elongated elements, means for holding said elements in spaced relation, and anti-slipping members supported by said elements and having their upper ends extending upwardly slightly above the upper horizontal plane of said elements and laterally thereof, said members being small in cross-section and separated from one another a distance less than the width of the heel of a brakeman's shoe to form an anti-slipping tread surface.

SVEN J. STRID.